(12) United States Patent
Riley et al.

(10) Patent No.: US 11,701,914 B2
(45) Date of Patent: Jul. 18, 2023

(54) USING INDEXING TARGETS TO INDEX TEXTUAL AND/OR GRAPHICAL VISUAL CONTENT MANUALLY CREATED IN A BOOK

(71) Applicants: Edward Riley, Seattle, WA (US); Heather Picken, Seattle, WA (US)

(72) Inventors: Edward Riley, Seattle, WA (US); Heather Picken, Seattle, WA (US)

(*) Notice: Subject to any disclaimer, the term of this patent is extended or adjusted under 35 U.S.C. 154(b) by 0 days.

(21) Appl. No.: 16/901,782

(22) Filed: Jun. 15, 2020

(65) Prior Publication Data

US 2021/0387468 A1     Dec. 16, 2021

(51) Int. Cl.
 *B42D 9/00* (2006.01)
 *G06F 16/51* (2019.01)
 *B42D 1/00* (2006.01)
 *G06F 3/0483* (2013.01)
 *G06V 30/413* (2022.01)

(52) U.S. Cl.
 CPC ............. *B42D 9/001* (2013.01); *B42D 1/009* (2013.01); *G06F 3/0483* (2013.01); *G06F 16/51* (2019.01); *G06V 30/413* (2022.01); *B42P 2221/04* (2013.01); *G06V 2201/131* (2022.01)

(58) Field of Classification Search
 USPC ................ 382/224, 112, 306; 358/1.17, 527; 235/470; 707/17.008; 715/268, 224
 See application file for complete search history.

(56) References Cited

U.S. PATENT DOCUMENTS

| | | | | |
|---|---|---|---|---|
| 4,937,439 A * | 6/1990 | Wanninger | ......... | G06K 17/0032 235/487 |
| 5,103,490 A * | 4/1992 | McMillin | ............... | G09B 7/066 235/440 |
| 5,339,412 A * | 8/1994 | Fueki | ...................... | G06F 16/93 |
| 5,890,177 A * | 3/1999 | Moody | .................. | G06Q 10/10 715/210 |
| 5,921,582 A * | 7/1999 | Gusack | .................. | B42D 12/00 283/67 |
| 6,975,352 B2 * | 12/2005 | Seeger | ................. | H04N 23/698 382/284 |
| 8,456,688 B2 * | 6/2013 | Sasaki | ................ | H04N 1/00204 358/1.17 |
| 8,649,601 B1 * | 2/2014 | Ray | ..................... | G06V 30/1448 434/350 |
| 9,844,965 B1 | 12/2017 | Lemay et al. | | |
| 10,127,468 B1 * | 11/2018 | Lemay | ................. | H04N 1/3873 |
| 10,232,663 B2 | 3/2019 | Lemay et al. | | |

(Continued)

OTHER PUBLICATIONS

"Vertellis Chapters," retrieved on Jun. 9, 2020, from https://vertellis.com/products/vertellis-chapters, 15 pages.

(Continued)

*Primary Examiner* — Kathleen Y Dulaney
(74) *Attorney, Agent, or Firm* — Seed IP Law Group, LLP (57) ABSTRACT

A book made up of pages is described. At least some of the pages contain both space for manually-created visual content, and instances of preprinted indexing target symbols. Each of the indexing target symbol instances has at least a portion within one inch of three unbound page edges. When the book is closed, the instances of each particular indexing target symbol are in a substantially collinear stack that is substantially perpendicular to the faces of the pages.

16 Claims, 11 Drawing Sheets

(56) References Cited

U.S. PATENT DOCUMENTS

| | | | |
|---|---|---|---|
| 10,474,922 B1 | 11/2019 | Lemay et al. | |
| 10,618,345 B2 | 4/2020 | Lemay et al. | |
| 11,148,455 B2 | 10/2021 | Epstein et al. | |
| 11,294,563 B1 | 4/2022 | Epstein et al. | |
| 11,295,410 B2 | 4/2022 | Lemay et al. | |
| 2002/0107885 A1* | 8/2002 | Brooks | G06F 40/174 715/224 |
| 2006/0282442 A1* | 12/2006 | Lennon | G06F 16/93 |
| 2007/0091393 A1* | 4/2007 | Matsumoto | G06V 30/1444 358/538 |
| 2007/0183688 A1* | 8/2007 | Hollfelder | G06Q 10/10 382/305 |
| 2009/0123071 A1* | 5/2009 | Iwasaki | G06V 30/1444 382/176 |
| 2009/0279793 A1* | 11/2009 | Misawa | G06V 30/413 382/224 |
| 2010/0010970 A1* | 1/2010 | Takeuchi | G06F 16/8373 707/E17.014 |
| 2010/0054583 A1* | 3/2010 | Huang | G06T 7/11 382/163 |
| 2010/0082937 A1* | 4/2010 | Sasaki | G06F 40/134 711/206 |
| 2011/0249299 A1* | 10/2011 | Wu | G06V 30/164 358/3.26 |
| 2013/0114914 A1* | 5/2013 | Dejean | G06V 30/416 382/317 |
| 2014/0143721 A1* | 5/2014 | Suzuki | G06K 9/2063 715/810 |
| 2015/0043032 A1* | 2/2015 | Kyojima | G06F 3/03545 358/1.15 |
| 2015/0302242 A1* | 10/2015 | Lee | G06F 40/131 382/189 |
| 2016/0117303 A1* | 4/2016 | Topness | H04L 67/1085 715/255 |
| 2018/0067913 A1* | 3/2018 | Takesue | G06F 3/04883 |
| 2019/0005347 A1* | 1/2019 | Kishimoto | G06V 30/412 |
| 2019/0147286 A1* | 5/2019 | Marks | G06V 30/1478 382/321 |
| 2021/0303838 A1* | 9/2021 | Sickert | G06V 10/56 |

OTHER PUBLICATIONS

"How Rocketbook Works," retrieved on Jun. 9, 2020, from https://getrocketbook.com/pages/how-rocketbook-works, 5 pages.

"Setting Up Your Rocketbook App—A Quickstart Guide," retrieved on Jun. 9, 2020, from https://getrocketbook.com/blogs/news/setting-up-your-rocketbook-app-a-quickstart-guide, 5 pages.

"Sync It Right The First Time," retrieved on Jun. 9, 2020, from https://getrocketbook.com/blogs/news/sync-it-right-the-first-time, 5 pages.

\* cited by examiner

USING INDEXING TARGETS TO INDEX TEXTUAL AND/OR GRAPHICAL VISUAL CONTENT MANUALLY CREATED IN A BOOK

BACKGROUND

Handwriting on paper can be used to generate text for a variety of purposes, journaling, note-taking, and list-making. People may similarly manually create other visual content on paper (or other similar media), such as sketching, painting, stamping, etc.

This manual creation of content may be performed on loose-leaf paper, or in a notebook, journal, or other book. When the visual content is created in a book, a person with access to the book can review the content in the book by turning pages.

DETAILED DESCRIPTION

The inventors have identified significant disadvantages of conventional approaches to creating visual content in books. In particular, it can be difficult to locate particular instances of content within a book, especially a book with many pages. In order for a person to find in a book a particular instance of content they created, or content in a particular category, they may have to turn to and visually review many or all of the pages in that book. A person other than the creator must typically perform an even more laborious review, based not just on recognizing recalled visual patterns, but cognitively processing the visual content of each page.

In some cases, to aid the process of finding visual content in a book, a person who creates the visual content constructs a written index or table of contents for that book, in which information about some or all pages is listed with the page's page number in a certain place, such as at the beginning or end of the book, on the book's cover, or in a place separate from the book. The inventors have recognized that creating and maintaining such an index or table of contents is burdensome: it is difficult to remember to do this; the creating and maintaining takes significant time; it is not always easy to find the sought information in the handwritten index or table of contents; and it takes at least a moment to locate the correct page once its page number is obtained from the index or table of contents.

In response to recognizing these disadvantages, the inventors have conceived and reduced to practice a system for using indexing targets to index textual and/or graphical visual content manually created in a book ("the system"). The system provides the substantial benefit of random access into a serially-organized book while requiring minimal manual effort to support this.

Figure 3:
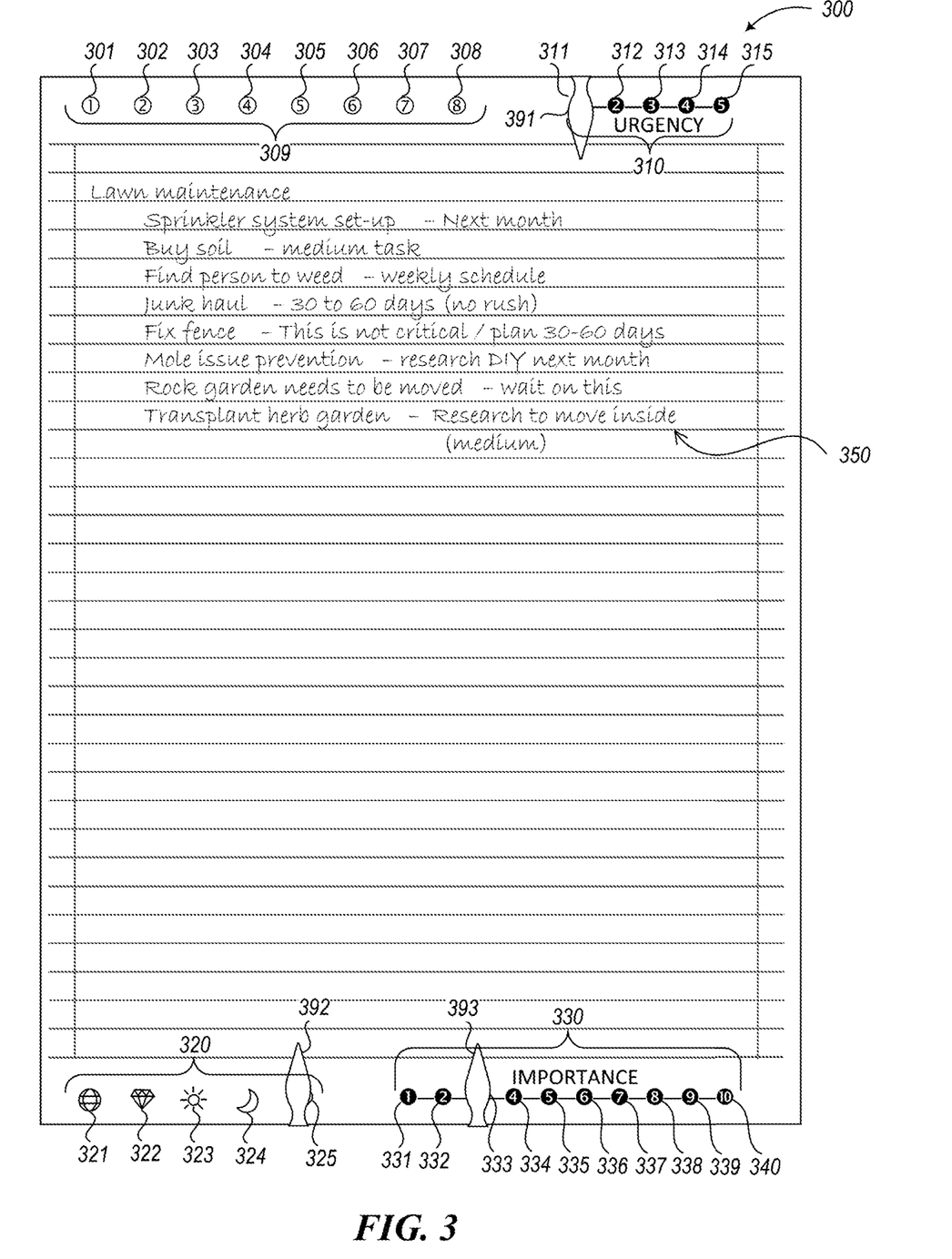
FIG. 3 is a page diagram showing a first sample page of a book, printed for use in the system in some embodiments.
Figure 4:
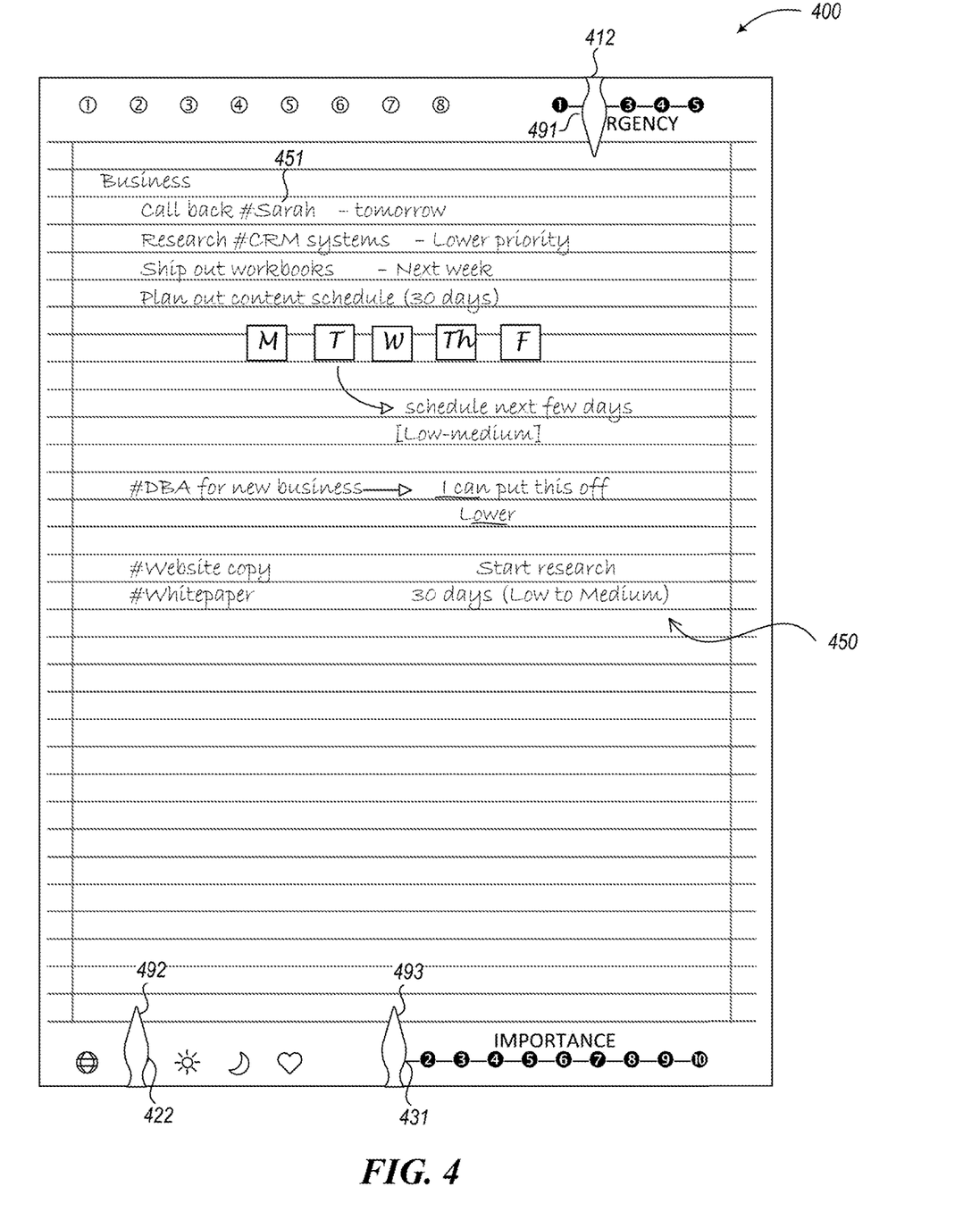
FIG. 4 is a page diagram showing a second sample page of the book.
Figure 5:
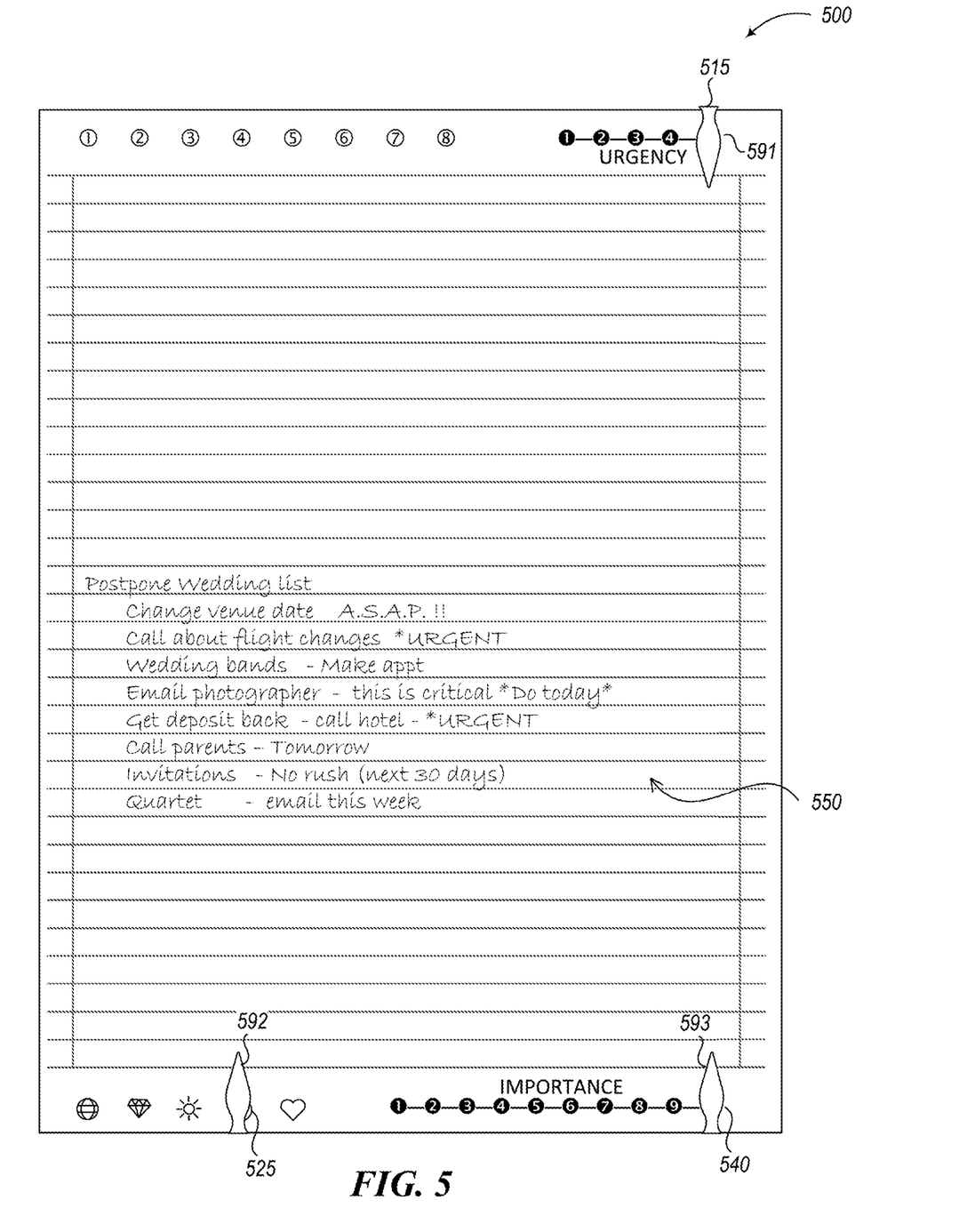
FIG. 5 is a page diagram showing a third sample page of the book

In accordance with the system, in some embodiments, a creator of visual content ("the creator") purchases, makes, or otherwise obtains a book in which one side of each of the pages is preprinted with a set of indexing targets along its perimeter. These indexing targets are each in a consistent location on each page-side on which they appear. Each of the indexing targets of the set corresponds to a different characterization of the page's content. For example, in various embodiments: ten indexing targets of the set correspond to different importance values 1-10; five indexing targets of the set correspond to different urgency levels 1-5; five indexing targets of the set correspond to different predetermined subjects; eight indexing targets of the set correspond to different creator-determined subjects; etc. FIGS. 3-5, discussed in greater detail below, show indexing targets used in accordance with the system in some embodiments.

After creating content on a page-side, the creator characterizes the created content by placing one or more book darts on the perimeter of the page-side. Book darts are small objects that can be attached to a particular point on the edge of a particular page, a portion of which is visible when viewing the page from the side. Each placed dart is near, points to, or obscures an indexing target chosen by the creator to characterize the created content. For example, in FIG. 3, the creator has placed three darts to characterize the content 350 created on page-side 300: a dart 391 is placed in a position along the top of the page-side corresponding to indexing target 311, which in turn corresponds to an urgency value of 1; a dart 392 is placed in a position along the bottom of the page-side corresponding to indexing target 325, which corresponds to a pre-determined subject of Personal Life; and a dart 393 is placed in a position along the bottom of the page-side corresponding to indexing target 333, which corresponds to an importance value of 3. The creator has thus characterized the content 350 as having an urgency value of 1, a pre-determined subject of Personal Life, and an importance value of 3.

After the creator has created content on multiple page sides and used darts to characterize that content, the darts form a physical index of the content of the book when viewed from the side. As an example, in the side-view shown in FIG. 7, discussed in greater detail below, darts 761 and 762 characterize content on a first page-side, darts 771 and 772 characterize content on a second page-side, and dart 781 and 782 characterize content on a third page-side. In particular, by being directly below indexing target 525, dart 761 characterizes the content on the first page-side with the pre-determined subject of Personal Life; by being directly below indexing target 733, book dart 762 characterizes the content on the first page-side with the importance value of 3.

Figure 7:
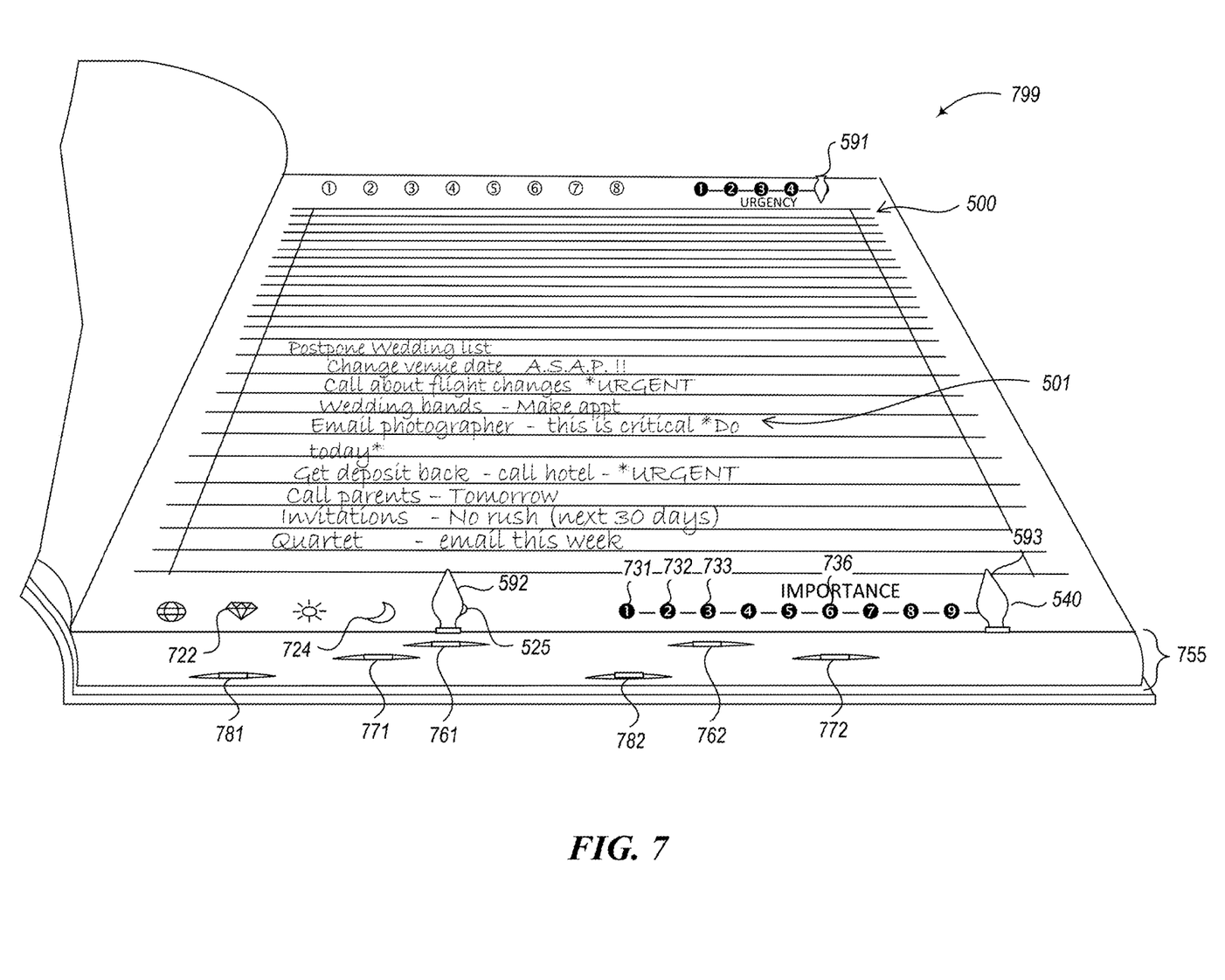
FIG. 7 is a perspective diagram showing a view of the book in which both a page-side and the lower side of the book are visible.

The creator or another user of the book can use the physical index formed by the darts to find and quickly turn to page-sides having content characterized in a particular way. For example, a user of the book interested in content having the importance value of 1 would look for darts directly beneath indexing target 731. Seeing there dart 782, the user would lift up on dart 782 and pull the pages above it upward to expose the third page-side to which dart 782 is attached. Darts form a physical index on any edge of the book on which indexing targets are marked with darts. Where multiple darts are directly beneath an indexing target of interest, the user can use these darts to flip quickly between the page-sides characterized with them.

The system's physical index may also be used to assess the contents of the book, such as determining the number of page-sides characterized with an importance value of 1 or 2 by counting the number of darts that line up under indexing targets 731 or 732.

In some embodiments, the system automatically creates an electronically-indexed electronic version of the book. This process begins by capturing images of some or all pages of the book. The system captures the images in a way that preserves in the captured images the creator's designation of indexing targets, such as by leaving the book darts in place, replacing each dart with an ink mark that won't impede the marked page's transit through a scanner, etc. The system then analyzes the captured images to determine how the indexing targets were used by the creator to characterize each page-side, and constructs one or more electronic indices that map from different characterizations or groups of characterizations to persistently stored copies of individual page-side images. The system provides a user interface that enables users to display the stored page images corresponding to particular characterization; display metrics about the book aggregated from the indices; etc.

By performing in some or all of the ways described above, the system makes it more straightforward, less time-consuming, and less burdensome to find visual content manually created in a book.

Also, the system improves the functioning of computer or other hardware, such as by reducing the dynamic display area, processing, storage, and/or data transmission resources needed to perform a certain task, thereby enabling the task to be performed by less capable, capacious, and/or expensive hardware devices, and/or be performed with less latency, and/or preserving more of the conserved resources for use in performing other tasks or additional instances of the same task. As one example, by using indexing characterizations explicitly and unambiguously specified by the creator, the system makes it unnecessary to commit processing resources to inferring or otherwise automatically determining indexing characterizations for pages or page-sides.

Figure 1:
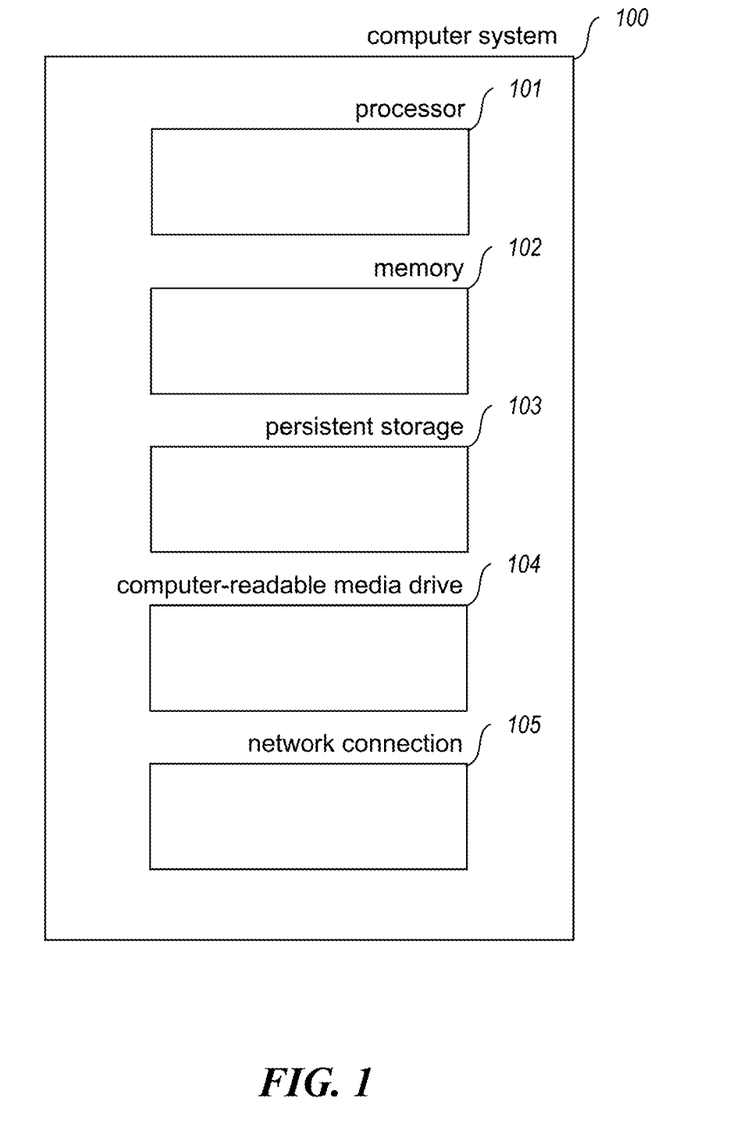
FIG. 1 is a block diagram showing some of the components typically incorporated in at least some of the computers and other devices on which the system operates.

FIG. 1 is a block diagram showing some of the components typically incorporated in at least some of the computers and other devices on which the system operates. In various embodiments, these computers and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. In some embodiments, the facility makes use of cloud services of a variety of types, including in some cases machine learning and/or natural language processing cloud services. While computer systems configured as described above are typically used to support the operation of the facility, those skilled in the art will appreciate that the facility may be implemented using devices of various types and configurations, and having various components.

Figure 2:
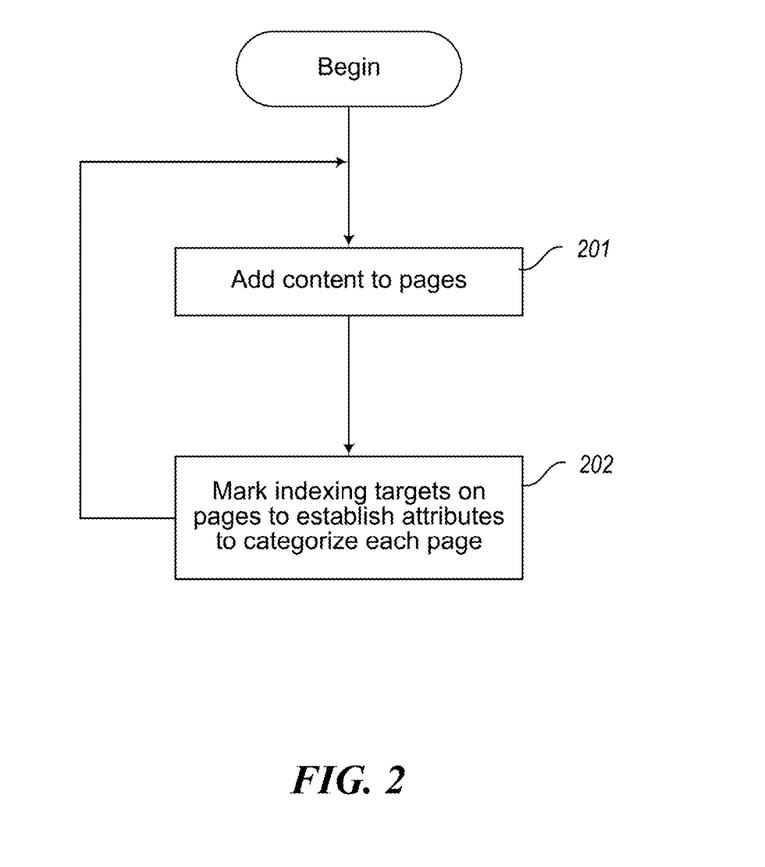
FIG. 2 is a flow diagram showing a process performed by the system in some embodiments in order to construct an index for a book.

FIG. 2 is a flow diagram showing a process performed by the system in some embodiments in order to construct an index for a book. In act 201, a creator adds content to pages of the book. In act 202, the creator uses indexing targets on these pages to establish indexing characterizations, or "attributes," for each page, such as marking these indexing targets with book darts or other marking devices, or marking on the page with a writing utensil, highlighter, etc. After act 201, the process continues in act 201 in which the creator can add content to additional pages of the book. This process is described further below with respect to FIGS. 3-5.

FIG. 3 is a page diagram showing a first sample page of a book, printed for use in the system in some embodiments. The first sample page 300 was printed with a set of indexing targets, made up of four groups, groups 300, 310, 320, and 330.

Group 320 contains indexing targets 321-325, each representing a different predefined subject, or "channel." In particular: indexing target 321, shaped like a globe, corresponds to a global channel, and represents items of global importance to the creator—that is, items that cross multiple of the other channels, or that don't correspond to any of the other channels, for example; indexing target 322, shaped like a diamond, corresponds to a diamond channel, and represents items relating to the creator's primary employment or business; indexing target 323, shaped like a sun, corresponds to a sun channel, and represents items relating to the creator's primary talent; indexing target 324, shaped like a moon, corresponds to a moon channel, and represents items relating to the creator's hidden talent (e.g., a hobby, a side-hustle, a new skill, higher education, or family); indexing target 325, shaped like a heart and obscured in FIG. 3 by the dart placed over it, corresponds to a heart channel, and represents items relating to the creator's personal life. In various embodiments, the facility uses a variety of other sets of channels or other types of predefined categories to characterize pages with indexing targets.

Group 310 contains indexing targets 311-315, each representing a different level or value of urgency. Group 330 contains indexing targets 331-340, each representing a different level or value of importance. In various embodiments, the facility uses a variety of other kinds of quantitative measures to characterize pages with indexing targets, including, for example, degree confidence, satisfaction, happiness, completion, success, value, etc.

Group 300 contains indexing targets 301-308, each representing a different creator-defined subject. In some embodiments, a page near the beginning of the book is preprinted with spaces for writing the creator-defined subject corresponding to each of indexing targets 301-308.

While indexing targets are shown only on the top and bottom edges of the page in FIG. 3 and the Figures that follow, in various embodiments, indexing targets are additionally or instead located along the right edge of the page.

The creator opened the book to page 300, and wrote content 350. The creator then characterized content 350 by placing book darts on three indexing targets: indexing targets 325, 333, and 311, indicating that the content relates to a heart channel and represents items relating to the creator's personal life; has an importance level of 3, and has an urgency level of 1.

FIGS. 4 and 5 show additional sample pages of the same book, printed with the same set of indexing targets in the same locations. FIG. 4 is a page diagram showing a second sample page of the book. The creator has added to the second sample page 400 content 450. The creator has further placed three darts to characterize this content. Dart 492 marks the indexing target 422 for the diamond channel, indicating that this content relates to the creator's primary employment or business. Dart 493 marks the indexing target 431 for the importance value of 1, and dart 491 marks the indexing target 412 for the urgency value of 2. The creator has thus indicated that this content relates to his or her primary employment or business, and has low importance and urgency levels.

It can be seen on page 400 that the creator has marked some of the words and phrases in content 450 with hash marks ("#"). In some embodiments, when pages of the book are scanned, the system treats words and phrases marked with a hash mark as keywords. In various embodiments, the system uses the keywords to make the content of the pages of the book accessible for keyword indexing and/or keyword searching. In some embodiments, the system constructs keyword indices for display and/or searching using words not explicitly marked as keywords, such as by incorporating all written words, or by using automatic inference to discern keywords among the written words.

FIG. 5 is a page diagram showing a third sample page of the book. The creator has added to the third sample page 500 content 550. The creator has further placed three darts to characterize this content. Dart 592 marks the indexing target 525 for the heart channel, indicating that this content relates to the creator's personal life. Dart 593 marks the indexing target 540 for the importance value of 10, and dart 591 marks the indexing target 515 for the urgency value of 5. The creator has thus indicated that this content relates to his or her personal life, and has high importance and urgency levels.

In some embodiments, indexing targets are only printed on one side of each page, such as on the front side of each page. In some embodiments, indexing targets are printed on both sides of each page. In some such embodiments, each indexing target is printed in one position on the front sides of pages and a different position on the back sides of pages, such that book darts placed on a particular indexing target on both sides of the page stack together in the same column of book darts. In some such embodiments, different indexing targets are printed on the front sides of pages than are printed on the back sides of pages, such that book darts placed on any of the indexing targets printed on the front sides of pages do not stack in or confusingly near the same column as book darts placed on any of the indexing targets printed on the back sides of pages.

In various embodiments (not shown), creators mark some or all indexing targets in ways other than attaching a book dart. In some such embodiments, creators attach other devices to pages that are visible from the side of the book in its page stack, such as, for example, paperclips, sticky tabs, or other similar devices. Attached devices of these similar types also form a physical index on the side of the book.

In some such embodiments, creators mark the indexing targets on the page, such as using a pen, pencil, marker, highlighter, paint pen, decal, etc. The marking can be any style of symbol or pattern that is written, drawn, or otherwise placed on or near the indexing target; may fully or partially fill a shape that is part of the indexing target; can constitute circling the indexing target; etc. In some embodiments, these markings extend to the edge of the page, such that a physical index can be discerned by pushing the bottom of the exposed page toward the top of the book, splaying the pages behind it to render the markings visible in the stack of pages.

Figure 6:
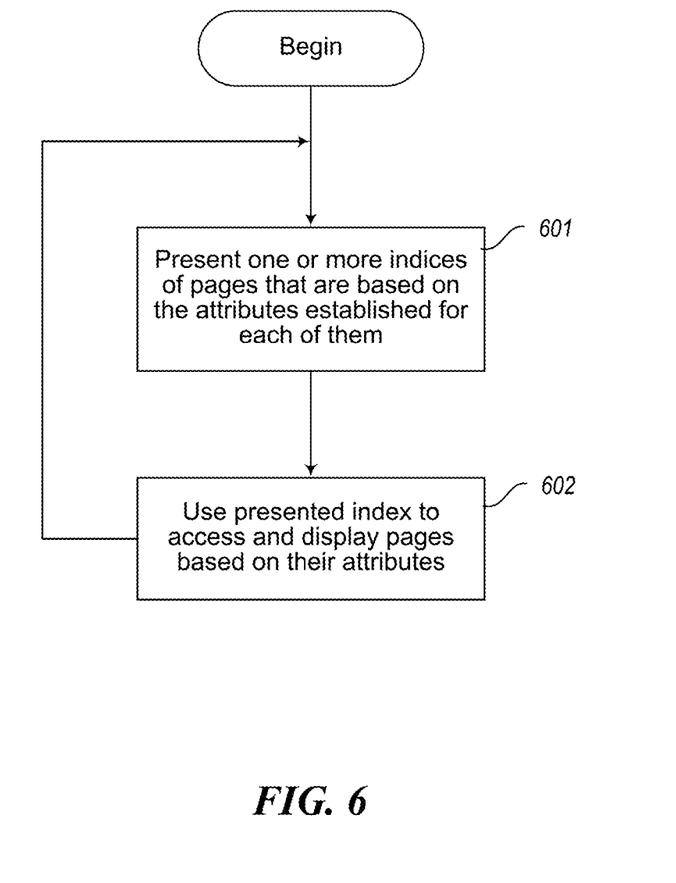
FIG. 6 is a flow diagram showing a process performed by the system in some embodiments in order to provide access to a book through an index.

FIG. 6 is a flow diagram showing a process performed by the system in some embodiments in order to provide access to a book through an index. In act 601, the system presents to a user one or more indices for the book that are based on attributes established for each page by the creator using indexing targets. In act 602, the system enables a user to use the presented index to access and display pages of the book based on their attributes. After act 602, the system continues in act 601 to again present the indices.

In some embodiments, the system performs act 601 by making available the physical index created by the placed book darts or other indexing target markers or markings. In such embodiments, the system performs act 602 by enabling the user to view the side of the book, and the portions of the indexing target markers or markings that are visible from the side of the book, and interact with these to access individual pages of the book that are of interest.

FIG. 7 is a perspective diagram showing a view of the book in which both a page-side and the lower side of the book are visible. The view 799 shows page 500 from FIG. 5, including its content 501 and its book darts 591-593. The view further shows the lower side 755 of the book, in which the edges of six additional book darts attached to later pages can be seen. The edges of the six book darts constitute a physical index. A first entry in the physical index is made up of book darts 761 and 762, which show that the page to which they are attached (page 300 shown in FIG. 3) is characterized with the heart channel and the importance value 3. The user may lift up on either of book darts 761 and 762 to open the book to page 300 and view the content thus characterized. A second entry in the physical index is made up of book darts 771 and 772, which show that the page to which they are attached are characterized with the moon channel and the importance value six. The user may lift up on either of book darts 771 and 772 to open the book to this page and view the content thus characterized. A third entry in the physical index is made up of book darts 781 and 782, which show that the page to which they are attached (page 400 shown in FIG. 4) is characterized with the diamond channel and the importance value 1. The user may lift up on either of book darts 781 and 782 to open the book to page 400 and view the content thus characterized.

In some embodiments, the system performs act 601 by capturing images of pages of the book, then processing those captured images. In various embodiments, the system performs this capture using specialized document scanners, such as wand scanners, flatbed scanners, sheet feed scanners, or production scanners; stand scanners that suspend an imaging device well above the document being captured; a general-purpose camera, such as a dedicated camera device, or a camera integrated into devices of other types, such as smart phones, tablet computers, laptop computers, etc. Rather than capturing a series of individual still images, in some embodiments the system captures a video sequence showing all of the pages, then automatically isolates individual frames and/or regions showing each page.

In such embodiments, the system subjects each captured page image to computer vision techniques in order to identify the indexing targets that were marked by the creator. In various embodiments, these computer vision techniques take advantage of such information as: inferred or explicitly specified shape patterns for the book darts or other markers or markings used to mark indexing targets; the absolute and/or relative locations at which each indexing target is printed on the page; the visual appearance of each indexing target; and/or the visual appearance of indexing targets near an indexing target that may be obscured by a book darts, markers, markings, or other visual obstructions.

The system uses the indexing targets identified as being marked for each page to construct an index data structure containing this information. For example, one entry of this index data structure corresponding to page 300 shown in FIG. 3 would contain information identifying page 300—such as by its sequential page number in the book; information usable to retrieve and display the system's image of the page—such as a path-qualified filename, content management system resource id, or other pointer to this image; and information indicating that the urgency level of 1, the heart channel, and the importance level of 3 were specified for the page.

Figure 8:
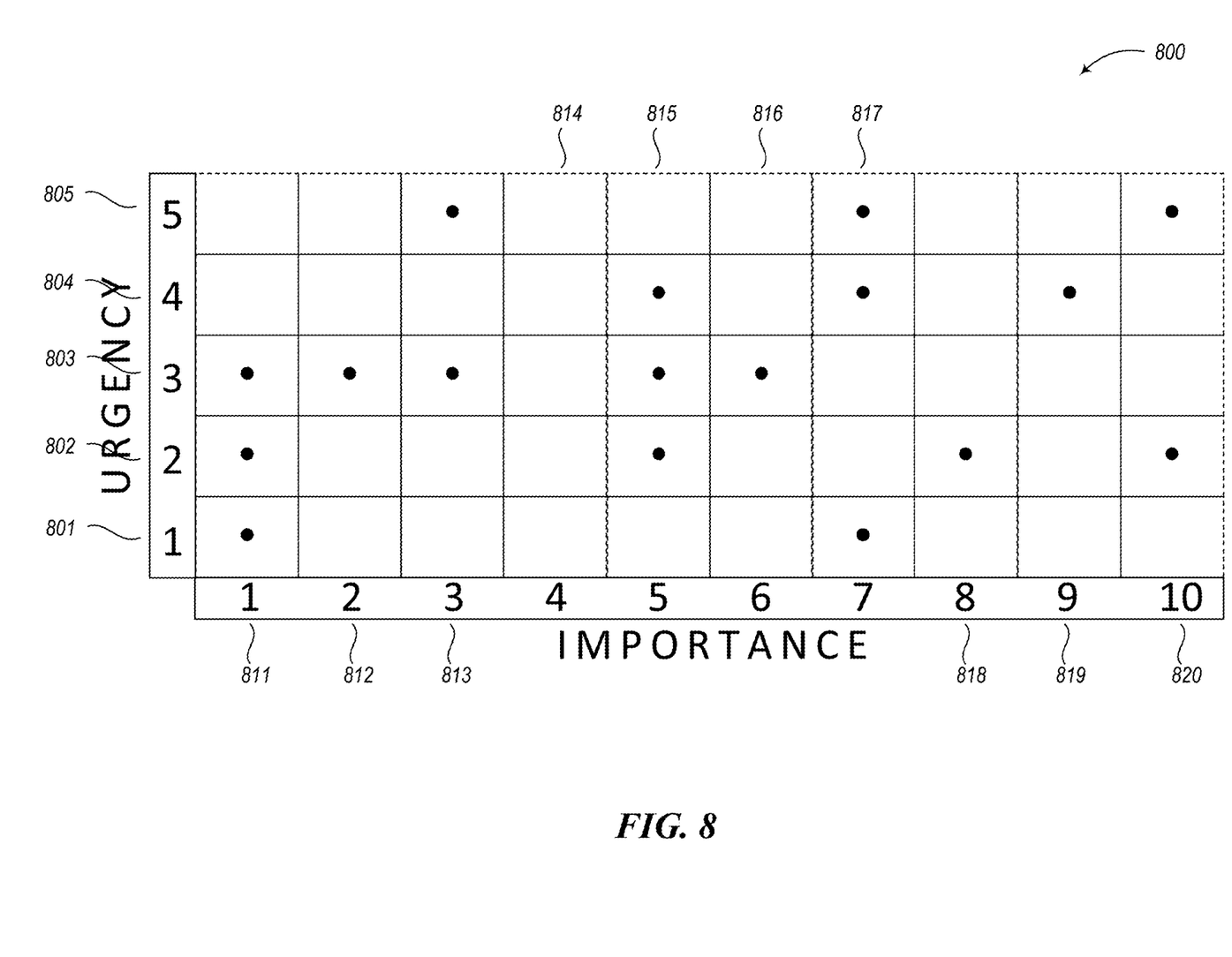
FIG. 8 is a user interface diagram showing a sample display presented by the system in some embodiments to enable a user to access pages of a book based upon their importance and urgency levels.
Figure 10:
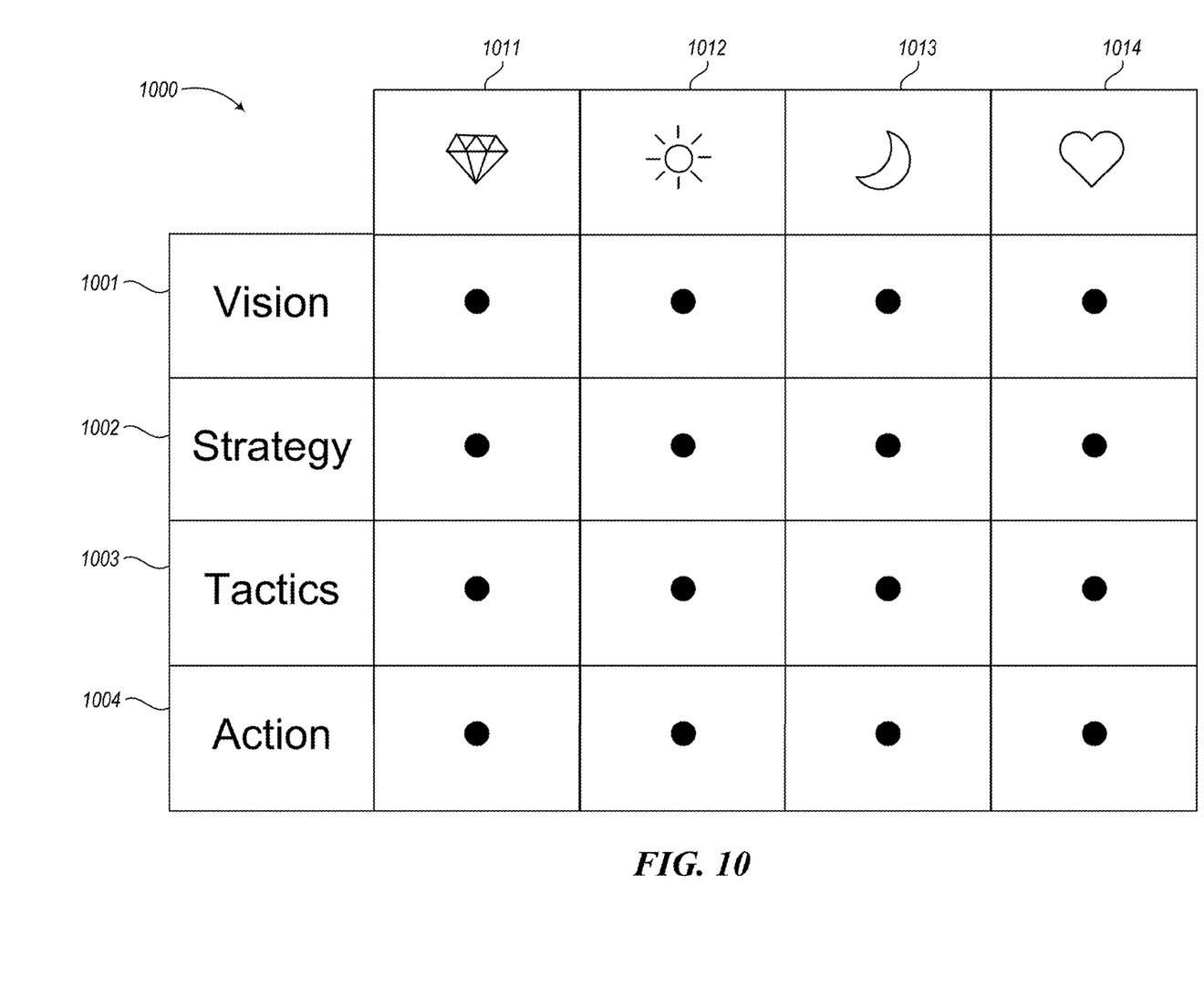
FIG. 10 is a user interface diagram showing a sample display presented by the system in some embodiments to enable a user to access pages of a book based upon their channel and stratum.
Figure 11:
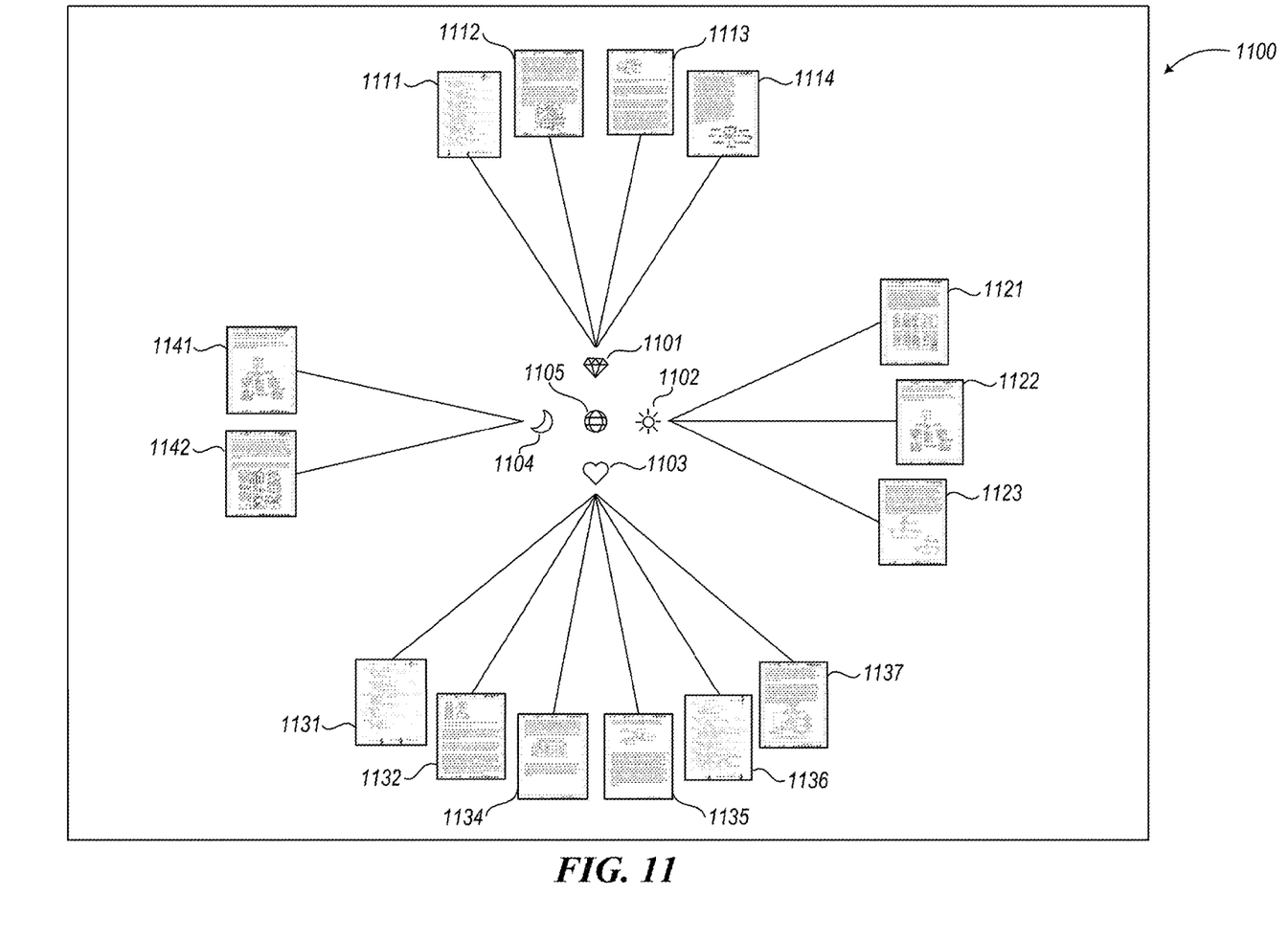
FIG. 11 is a user interface diagram showing a sample display presented by the system in some embodiments to enable a user to access pages of a book in a mind map based upon their channel.

Based upon this index data structure automatically constructed by the system, the system displays one or more visual electronic index user interfaces that enable a user to identify and display pages having particular attributes. FIGS. 8, 10, and 11 show examples of such user interfaces provided by the system in some embodiments.

FIG. 8 is a user interface diagram showing a sample display presented by the system in some embodiments to enable a user to access pages of a book based upon their importance and urgency levels. This display is sometimes called an "Urgency/Importance Matrix," or "UI Matrix." The sample display 800 contains a grid in which rows each representing a different urgency level (here, rows 801-805) intersect with columns each representing a different importance level (here, columns 811-820). Thus, each cell of the grid occurring at the intersection of a particular row with a particular column corresponds the combination of the urgency level to which the row corresponds with the importance level to which the column corresponds. For example, the cell in the upper right-hand corner corresponds to the combination of the urgency level 5 with the importance level 10. Each cell contains visual information describing the pages of the book having the urgency level and importance level to which the cell corresponds. As shown, a cell contains a dot if the book contains one or more pages having the urgency level and importance level to which it corresponds, and does not contain a dot if the book contains no pages having the urgency level and importance level to which it corresponds. For example, by including a dot, the cell in the upper right-hand corner indicates that the book contains one or more pages having urgency level 5 and importance level 10. Inversely, by not including a dot, the cell in the lower-right-hand corner indicates that the book contains no pages having urgency level 1 and importance level 10. In various embodiments, the visual information contained by each cell contains, for example: a number indicating the number of pages in the book having the cell's combination of urgency level and importance level; a shape whose size indicates this number of pages; a collection of small shapes whose number is equal or proportional to this number of pages; snippets or summaries of one or more of these pages; etc.

In some embodiments, the user viewing the user interface can click on a cell to display more information about the pages to which the cell corresponds. In various embodiments, this additional information can include copies of some of these pages at any level of magnification; other forms of lists of these pages; or information collected and/or aggregated from these pages.

Figure 9:
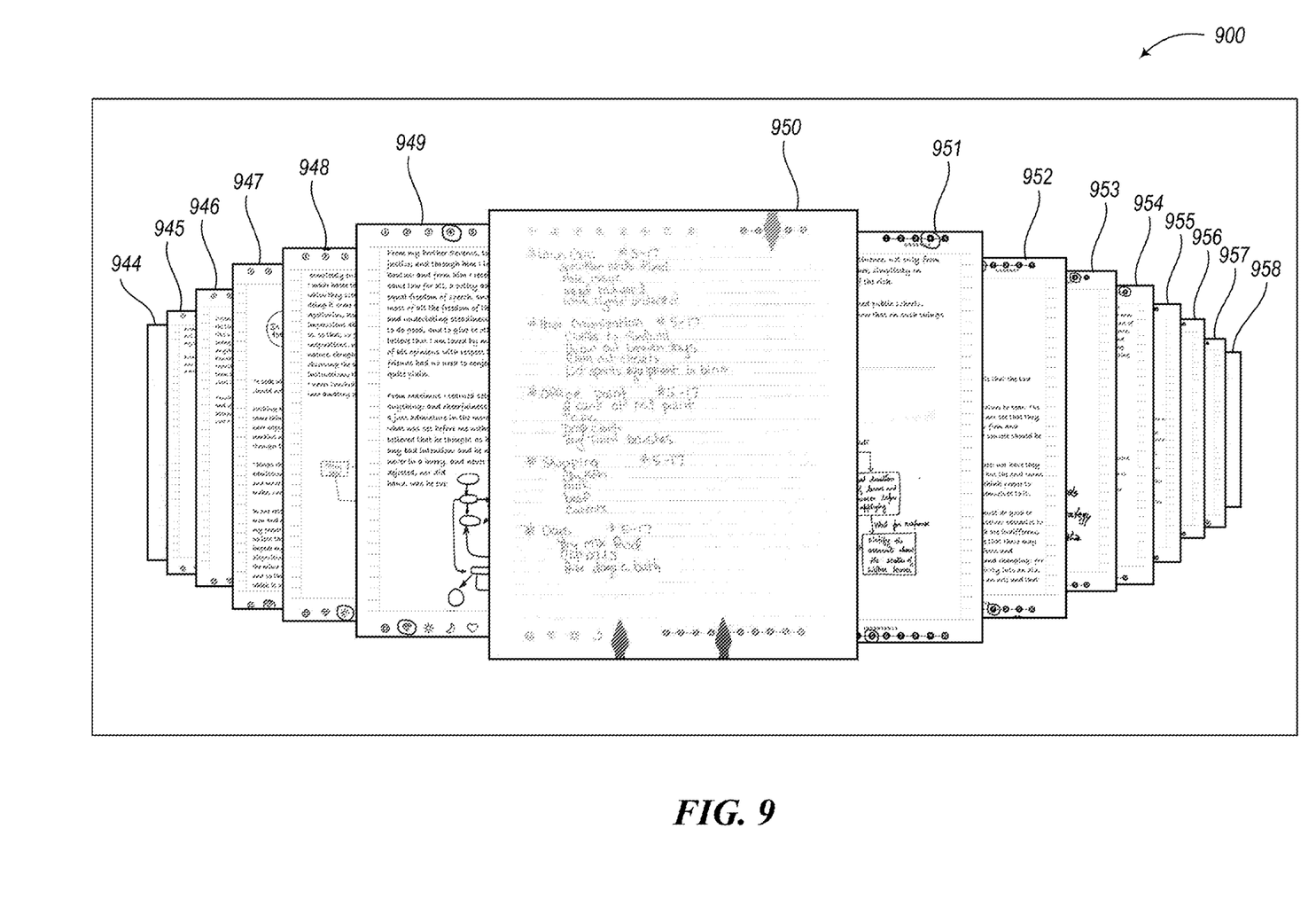
FIG. 9 is user interface diagram showing a display presented by the system in some embodiments to enable a user to view images of particular pages identified by using one of the system's electronic index user interfaces.

FIG. 9 is user interface diagram showing a display presented by the system in some embodiments to enable a user to view images of particular pages identified by using one of the system's electronic index user interfaces. In the example shown, the system has presented this display 900 in response to user touching, clicking on, or otherwise selecting the cell in display 800 that is at the intersection of urgency level 3 and importance level 5. It can be seen that display 900 includes copies of pages 944-958 of the book. Page 950 is at the center, at the highest magnification level, and its entire area is displayed. This page is featured in the display because it is the only one in the book that is responsive to the "query" generated by selecting the cell at the intersection of urgency level 3 and importance level 5. In the user interface exemplified in FIG. 9, the user may scroll through other pages in the book, such as by pushing left or right; rolling a scroll wheel; typing an arrow or scrolling key on the keyboard; clicking, touching, or otherwise selecting the displayed portion of any page; etc. Were there other pages responsive to the query, they would appear next to central page 950, and in some embodiments would be explicitly designated as satisfying the query, such as having their borders displayed in bold or in a color different from the borders of the other pages, being indicated with arrows or other symbols, etc. In some embodiments (not shown), the system shows only pages responsive to the query in display 900. In various embodiments, the system takes a variety of approaches to displaying the pages satisfying a query, such as: displaying the entire area of each of these pages, in various arrangements; displaying only one of these pages at a time, with a mechanism for navigating through them; etc.

FIG. 10 is a user interface diagram showing a sample display presented by the system in some embodiments to enable a user to access pages of a book based upon their channel and stratum. In a manner similar to display 800 shown in FIG. 8, display 1000 shown in FIG. 10 contains a grid comprised of cells. Each cell occurs at the intersection of a row corresponding to a different stratum (Vision, Strategy, Tactics, or Action, in rows 1001-1004) an account corresponding to a different channel (diamond, sun, moon, and heart, in columns 1011-1014). Strata are different levels of detail at which a person can pursue objectives, for different durations. For example, a person may pursue a vision for a year or more, such as establishing a successful career in auto sales; a constituent strategy, pursued for a period of a few weeks, might be starting an auto sales position; an included tactic, pursued for a few days, may be identifying open positions; an involved action item, taking less than a day, could be performing a web search for nearby auto dealers. In various embodiments, the system uses stratum levels other than those shown and described here.

Also similar to display 800 shown in FIG. 8, each cell contains a visual indication of any pages of the book that have been specified as having the stratum of the cell's row and the channel of the cell's column. Further similar to display 800 shown in FIG. 8, the user can click, touch, or otherwise pages of the book that have been specified as having the stratum of the cell's row and the channel of the cell's column.

FIG. 11 is a user interface diagram showing a sample display presented by the system in some embodiments to enable a user to access pages of a book in a mind map based upon their channel. In the display 1100, channel symbols 1101-1105 are arranged in the center of the mind map, also known as a "concept map" or "vision map." Each of channels 1101-1104 is connected by line segments to small copies of pages of the book for which the channel is specified. For example, it can be seen that page copies 1121-1123 are each connected to the sun channel symbol 1102, indicating that the sun channel has been specified for each of them. From this mind map display, user may take a variety of actions to display additional information about the identified pages. For example, in a variety of embodiments: the user can zoom in on a particular displayed page to display its content at a higher magnification level; may click, touch or otherwise select one of the pages to display it at the maximum magnification level at which the entire page fits on the screen; may click, touch or otherwise select one of the channel symbols to display multipage display, similar to display 900 shown in FIG. 9, where all of the pages connected to that channel symbol are available for viewing at a higher magnification level; etc.

In some embodiments (not shown), indexing targets are pre-printed on dot-encoded paper, such that the creator can create content and designate appropriate indexing targets with a smart pen, enabling the system to automatically upload the created content and indexing target designations to a computer system from the smart pen, and automatically create digital versions of the content and an electronic index without the need for any further optical scanning or photography.

In some embodiments, the creator uses a dynamic display such as a tablet computer or e-paper to create visual content on virtual pages and designate appropriate indexing targets, such as by marking them with a stylus or their finger. These pages exist in the first instance as electronic documents, and need not be scanned in order to be electronically indexed by the system.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more units of computer-readable media collectively having contents configured to cause the computing system to perform a method for indexing pages containing manually-created visual content, none of the units of computer-readable media constituting either a signal per se or a carrier wave per se, the method comprising:
   for each of a plurality of pages, capturing an image of the page, all of the captured images showing the same set of preprinted indexing targets, each of the preprinted indexing targets of the set having a different visual appearance;
   for each of the captured images, using machine vision techniques to identify in the captured image which of the set of preprinted indexing targets have been marked on the captured image to characterize manually-created visual content in the captured image, the manually-created visual content characterized by each marked preprinted indexing target being in a different location in the captured image than the preprinted indexing target; and
   constructing a data structure indicating, for each captured image, the indexing targets identified as being marked,
wherein each preprinted indexing target of the set corresponds to a different manually-created content attribute,
and wherein using machine vision techniques to identify in the captured image which of the set of preprinted indexing targets have been marked on the captured image to characterize manually-created visual content in the captured image comprises, for each of the captured images, using machine vision techniques to identify the preprinted indexing targets that have been marked in the captured image to characterize manually-created content in the captured image by attributing to manually-created content in the captured image the manually-created content attributes to which the marked preprinted indexing targets correspond,
the method further comprising:
   displaying visual indications of at least some of the manually-created content attributes to which the preprinted indexing targets correspond;
   receiving user input selecting a displayed visual indication;
   in response to the receiving:
      identifying captured images that the constructed data structure indicates show the indexing target corresponding to the manually-created content attribute indicated by the selected visual indication being marked in the captured image; and
      displaying at least one of the identified captured images.

2. The one or more units of computer-readable media of claim 1 wherein the capturing is performed using a document scanner.

3. The one or more units of computer-readable media of claim 1 wherein the capturing is performed using a handheld camera.

4. The one or more units of computer-readable media of claim 1 wherein the used machine vision techniques rely at least in part on a standard position of each preprinted indexing target on all of the captured images.

5. The one or more units of computer-readable media of claim 1 wherein the used machine vision techniques rely at least in part on the appearance of the preprinted indexing targets.

6. The one or more units of computer-readable media of claim 1 wherein a distinguished one of the preprinted indexing targets is identified as having been marked based upon the distinguished preprinted indexing target being obscured by a mark.

7. The one or more units of computer-readable media of claim 1 wherein a distinguished one of the preprinted indexing targets is identified as having been marked based upon the distinguished preprinted indexing target being encircled by a mark.

8. The one or more units of computer-readable media of claim 1 wherein all of the captured images further show a second set of preprinted indexing targets, each of the second set of preprinted indexing targets having a different value within a value range, the second set of preprinted indexing targets being arranged in a series such that their values are monotonic, the method further comprising, for each of one or more of the captured images, determining a position that has been marked relative to the series that corresponds to a value within the value range.

9. A method in a computing system for indexing pages containing manually-created visual content, the method comprising:

for each of a plurality of pages, capturing an image of the page, all of the captured images showing the same set of preprinted indexing targets, each of the preprinted indexing targets of the set having a different visual appearance;

for each of the captured images, using machine vision techniques to identify in the captured image which of the set of preprinted indexing targets have been marked on the captured image to characterize manually-created visual content on the captured image, the manually-created visual content characterized by each marked preprinted indexing target being in a different location in the captured image than the preprinted indexing target; and constructing a data structure indicating, for each captured image, the indexing targets identified as being marked, wherein each preprinted indexing target of the set corresponds to a different manually-created content attribute, and wherein using machine vision techniques to identify in the captured image which of the set of preprinted indexing targets have been marked on the captured image to characterize manually-created visual content in the captured image comprises, for each of the captured images, using machine vision techniques to identify the preprinted indexing targets that have been marked in the captured image to characterize manually-created content in the captured image by attributing to manually-created content in the captured image the manually-created content attributes to which the marked preprinted indexing targets correspond, further comprising:

displaying visual indications of at least some manually-created content attributes to which the preprinted indexing targets correspond;

receiving user input selecting a displayed visual indication;

in response to the receiving:

identifying captured images that the constructed data structure indicates show the indexing target corresponding to the manually-created content attribute indicated by the selected visual indication being marked in the captured image; and displaying at least one of the identified captured images.

10. The method of claim 9 wherein all of the captured images further show a second set of preprinted indexing targets, each of the second set of preprinted indexing targets having a different value within a value range, the second set of preprinted indexing targets being arranged in a series such that their values are monotonic, the method further comprising, for each of one or more of the captured images, determining a position that has been marked relative to the series that corresponds to a value within the value range.

11. The method of claim 9 wherein the capturing is performed using a document scanner.

12. The method of claim 9 wherein the capturing is performed using a handheld camera.

13. The method of claim 9 wherein the used machine vision techniques rely at least in part on a standard position of each preprinted indexing target on all of the captured images.

14. The method of claim 9 wherein the used machine vision techniques rely at least in part on the appearance of the preprinted indexing targets.

15. The method of claim 9 wherein a distinguished one of the preprinted indexing targets is identified as having been marked based upon the distinguished indexing target being obscured by a mark.

16. The method of claim 9 wherein a distinguished one of the preprinted indexing targets is identified as having been marked based upon the distinguished indexing target being encircled by a mark.

* * * * *